(12) United States Patent
Joseph (10) Patent No.: US 11,394,773 B2
(45) Date of Patent: Jul. 19, 2022

(54) CRYPTOGRAPHIC CURRENCY BLOCK CHAIN BASED VOTING SYSTEM

(71) Applicant: Jim Austin Joseph, Houston, TX (US)

(72) Inventor: Jim Austin Joseph, Houston, TX (US)

(*) Notice: Subject to any disclaimer, the term of this patent is extended or adjusted under 35 U.S.C. 154(b) by 1467 days.

(21) Appl. No.: 14/745,370

(22) Filed: Jun. 19, 2015

(65) Prior Publication Data
US 2017/0061398 A1 Mar. 2, 2017

(51) Int. Cl.
| | |
|---|---|
| H04L 67/104 | (2022.01) |
| G06Q 20/08 | (2012.01) |
| G06Q 20/06 | (2012.01) |
| G06Q 20/36 | (2012.01) |

(52) U.S. Cl.
CPC ....... H04L 67/104 (2013.01); G06Q 20/0655 (2013.01); G06Q 20/0855 (2013.01); G06Q 20/3678 (2013.01); *H04L 2209/463* (2013.01); *H04L 2209/466* (2013.01)

(58) Field of Classification Search
CPC ..... G06F 17/40; G06F 7/766; G06Q 20/3827; H04L 2209/46; H04L 9/0637; H04L 2209/38; H04L 9/0618; H04L 2209/463
See application file for complete search history.

(56) References Cited

U.S. PATENT DOCUMENTS

2003/0088696 A1* 5/2003 McCanne ............... H04L 45/16
709/205
2015/0006895 A1* 1/2015 Irvine ................... H04L 9/3242
713/171
2016/0027229 A1* 1/2016 Spanos .................. G07C 13/00
705/51
2020/0129694 A1* 4/2020 Tang ...................... A61M 5/142

FOREIGN PATENT DOCUMENTS

AU 2009203095 A1 * 8/2009 ......... H04L 63/1433

OTHER PUBLICATIONS

'Cryptographic End-to-end Verifiability for Real-world Elections', Aleksander Essex, University of Waterloo, 2012.*
'Decentralizing Development through Vanity Voting', Cryptocurrencytalk.com, Developer Talk, Smokeasy, Jan. 20, 2014.*
'How Bitcoin will change the voting systems', Bitcoin Forum>Bitcoin>Bitcoin Discussion, Frozenlock, Aug. 13, 2011.*

* cited by examiner

*Primary Examiner* — Christine M Behncke
*Assistant Examiner* — Mary M Gregg (57) ABSTRACT

Systems and methods of decentralized block chain voting are provided. Polling data that includes a plurality of polling options and an option identifier associated with each polling option is retrieved. A customized cryptographic currency address is generated for each of the plurality of polling options based on the corresponding option identifier associated with each polling option. A specified amount of cryptographic tokens are transferred to the customized cryptographic currency address for a selected polling option. The transfer is broadcast to a cryptographic currency network for confirmation and inclusion within a block chain ledger of the cryptographic currency network.

14 Claims, 7 Drawing Sheets

CRYPTOGRAPHIC CURRENCY BLOCK CHAIN BASED VOTING SYSTEM

CROSS REFERENCE TO RELATED APPLICATIONS

The present application claims priority benefit under 35 U.S.C. §119(e) from U.S. Provisional Application No. 62/014,246, filed Jun. 19, 2014, which is incorporated herein by reference in its entirety.

BACKGROUND

Field of Disclosure

This disclosure relates in general to decentralized peer-to-peer (P2P) networking utilizing cryptography to secure transactions, and particularly, to decentralized polling in a peer-to-peer network using a cryptographic currency block chain.

Description of Related Art

The emergence and development of computer networks and protocols now allow many remote users to communicate with one another in real time. Different types of communication tools have been developed which allow users of a peer-to-peer network to communicate in a decentralized manner without having to access a central server. The use of cryptography in such networks further allowed users to securely track and transfer digital currency in a form of virtual tokens of account (often referred to as "bitcoins" or "cryptocoins"), which could not be counterfeited or double-spent.

Using this technology, users can almost instantly transfer cryptocoins from one cryptographic currency address to another without the need of a trusted third-party or centralized clearing house. All transfers and address balances within the cryptographic currency network are recorded within a public transaction ledger or "block chain" that is distributed to all users in the network and completely visible to anybody who wishes to view it. Every transaction since the origin of a cryptocoin is recorded in the block chain, a complete copy of which is stored by peer-to-peer nodes on the cryptographic network. Every transaction is time stamped by the decentralized peer-to-peer network in a transaction block of other transactions with each transaction block's time stamp hashed into an ongoing chain of a hash-based proof-system (e.g., proof-of-work; proof-of-stake; etc. . . . ), forming a public record that cannot be changed without re-doing the entire proof-system for each chained transaction block. The chained blocks of cryptographic currency's transactions make up the block chain.

To conduct a transaction in the cryptographic currency system, a user sends cryptocoins to another user by having their cryptographic currency wallet broadcast the transaction over the cryptographic currency's network to send the designated number of cryptocoins from the sender's cryptographic currency address to the recipient's cryptographic currency address. The transaction is broadcast to all peer-to-peer client nodes having an updated copy of the cryptographic currency block chain. The transaction can be grouped into blocks with other transactions once-per-cycle using cryptography to secure transactions (e.g., for bitcoin all transactions are grouped into 10 minute blocks).

A cryptographic currency block chain also allows users to cast votes in a centralized polling fashion by sending coins to a designated address, where the voting address with the highest balance would be declared the winner. However, a major short-coming of this method is that any coins used for voting must be sent to a third-party controlled address. As a result, the user casting a vote in this centralized block chain voting system would lose all of the coins that the user sends to the voting address of the third-party.

BRIEF DESCRIPTION OF THE DRAWING

Embodiments of the disclosure are described with reference to the accompanying drawings. In the drawings, like reference numbers may indicate identical or functionally similar elements. The drawings in which an element first appears are generally indicated by the left-most digit in the corresponding reference number.

DETAILED DESCRIPTION

While the present disclosure is described herein with reference to illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

The term "cryptographic token" used herein refers broadly and inclusively to a unit of account on an electronic ledger or block chain, using cryptography to secure transactions. Examples of such a cryptographic token include, but are not limited to, a bitcoin, a litecoin, a ripple, etc.

The term "voting address" used herein refers broadly and inclusively to any cryptographic currency address that a user sends coins to in order to cast a vote where each addresses balance represents the number of votes cast. A centralized voting address refers to an address where the address is controlled by a third-party that keeps all cryptographic tokens sent to that address.

Figure 1:
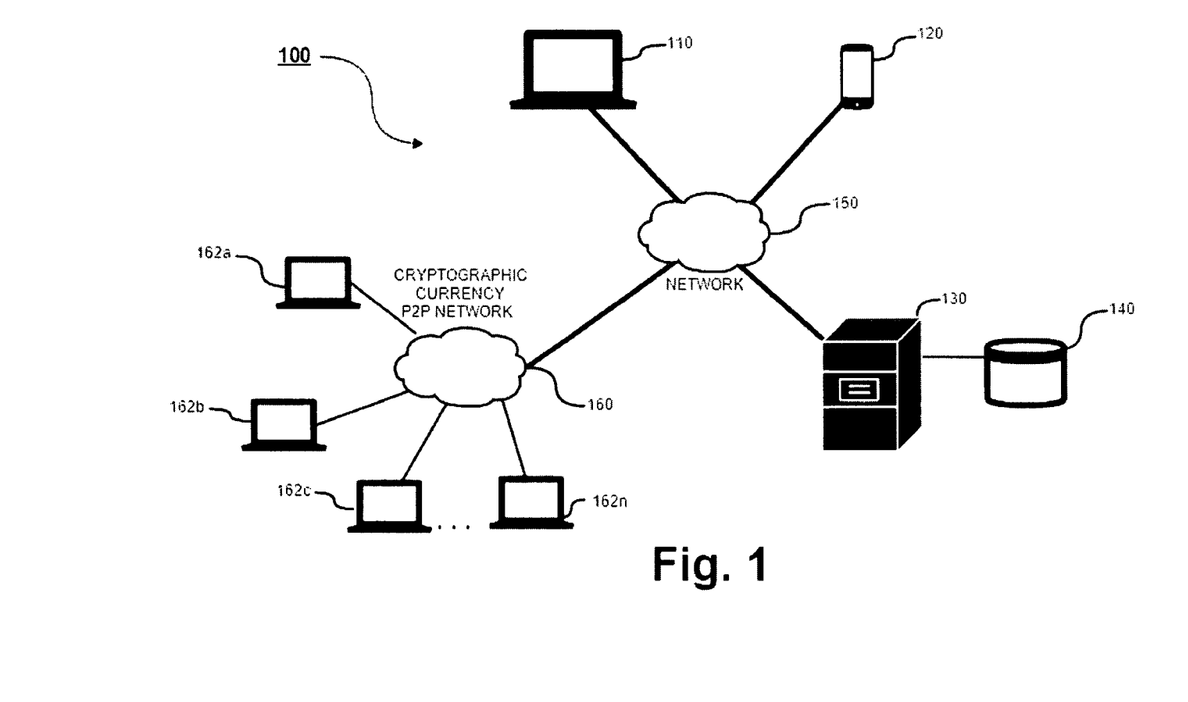
FIG. 1 is a diagram of an illustrative computer network environment in which embodiments of the present disclosure may be implemented.

FIG. 1 is a diagram of an illustrative computer network environment 100 in which embodiments of this disclosure may be implemented. Environment 100 may allow, for example, communication between a voter, represented by a computer 110 or a mobile or stand-alone device 120, a cryptographic currency peer-to-peer network 160 comprised of peer-to-peer nodes 162a 162b 162c . . . 162n, web-server 130 and web-server's database 140 over a network 150. Although FIG. 1 is described herein with reference to a computer 110, a mobile device 120 and web-server 130, one of skill in the art will recognize that FIG. 1 may also be utilized in providing communication between other devices, and in a peer-to-peer environment, and between applications and plug-ins without departing from the spirit and scope of the present disclosure.

In an embodiment, each of computer 110 and device 120 can be implemented using any type of computing device having at least one processor and a processor-readable storage medium for storing data and instructions executable by the processor. Such a computing device may also include an input/output (I/O) interface for receiving user input or commands via a user input device (not shown). The user input device may be, for example and without limitation, a mouse, a QWERTY or T9 keyboard, a touch-screen, a graphics tablet, or a microphone. The I/O interface also may be used by each computing device to output or present information to a user via an output device (e.g., a display device). The output device may be, for example, a display coupled to or integrated with the computing device for displaying a digital representation of the information being presented to the user. Examples of such a computing device include, but are not limited to, a mobile phone, a personal digital assistant (PDA), a tablet computer, a laptop computer, a desktop computer, a workstation, a cluster of computers, a set-top box, or similar type of computing device.

In operation, a voter using a computer 110 or device 120 can send and receive cryptographic tokens over the network 150 and the cryptographic currency peer-to-peer network 160. Network 150 can be any type of network or combination of networks used to communicate information between different computing devices. Network 150 can include, but is not limited to, a wired (e.g., Ethernet) or a wireless (e.g., Wi-Fi or mobile telecommunications) network. In addition, network 150 can include, but is not limited to, a local area network, medium area network, and/or wide area network such as the Internet. In an embodiment, network 150 also includes cryptographic currency peer-to-peer network 160. The software apparatus described in this disclosure allows the voter to view, vote and audit poll questions by either communicating with the web-server 130 which pulls voting data from its local database 140 or communicating with a peer-to-peer network to pull voting data from its network and sets up votes which it communicates to the computer 110 or mobile device 120, allowing the voter to view or vote on polls, the results of which are verified through the cryptographic currency peer-to-peer network 160.

Functionality described herein is described with respect to components or modules for clarity. However, this is not intended to be limiting, as functionality can be implemented on one or more modules on one or more devices or distributed across multiple devices.

Figure 2:
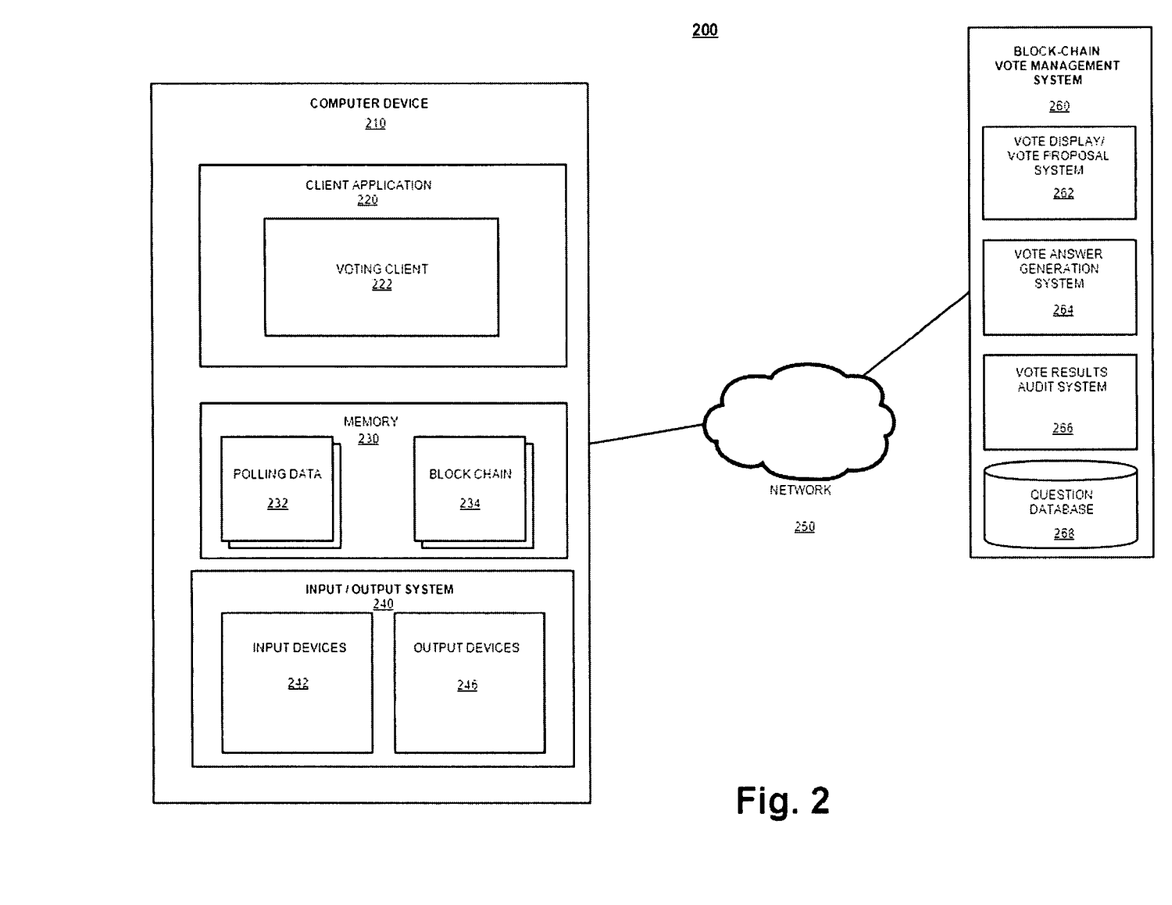
FIG. 2 is a diagram of an illustrative computer system including a computer and block chain vote management system in which different embodiments of this disclosure may be implemented.

FIG. 2 is a diagram of an illustrative computer system 200 including a computer and block chain vote management system 260. The computer device 210 contains an input/output system 240 which contains input devices 242 and output devices 246. The computer device 210 contains a client application 220 in which the voting client 222 can be contained or can be stand-alone. The memory 230 of the computer device 210 can contain a copy of the cryptographic currency's block chain 234 and polling data 232. The voting client 222, either directly or through the client application 220, communicates through the network 250 with the block chain vote management system 260, which can be either a centralized vote management system or a decentralized peer-to-peer vote management system. The centralized or decentralized block chain vote management system consists of a vote display or vote proposal system 262, a vote answer generation system 264, vote results audit system 266 and a question database 268. Although FIG. 2 is described herein with reference to typical software components between a computer device 210 and a block chain vote management system 260, one of skill in the art will recognize that FIG. 2 may also be utilized in demonstrating other software interactions without departing from the spirit and scope of the present disclosure.

In operation, the voter first engages the voting system through use of input devices 242 and views voting application data through output devices 246. After launching a voting client embodiment, the computer device 210 allows the voting client 222 to communicate over the network 250. The voting client 222 contacts the centralized or decentralized block chain vote management system 260 to retrieve voting information from the vote display or vote proposal system 262 which retrieves the required data from the question database 268.

If the voter wants to vote, the voting client 222 contacts the block chain vote management system 260 to retrieve polling data information from the vote answer generation system 264. The voting client 222 then generates the appropriate customized cryptographic currency voting address for the voter to send cryptographic tokens to signify its vote, which can be sent directly from the voting client 222 or the client application.

If the voter wants to audit a vote, a voting client 222 can contact the block chain vote management system 260 to retrieve vote results information from the vote results audit system 266 which retrieves information from the question database 268. The vote results audit system 266 scours the cryptographic currency block chain 234 to find all addresses matching the voting answer choice first-bits with balances at the voting deadline.

Functionality described herein is described with respect to components or modules for clarity. However, this is not intended to be limiting, as functionality can be implemented on one or more modules on one or more devices or distributed across multiple devices.

Figure 3:
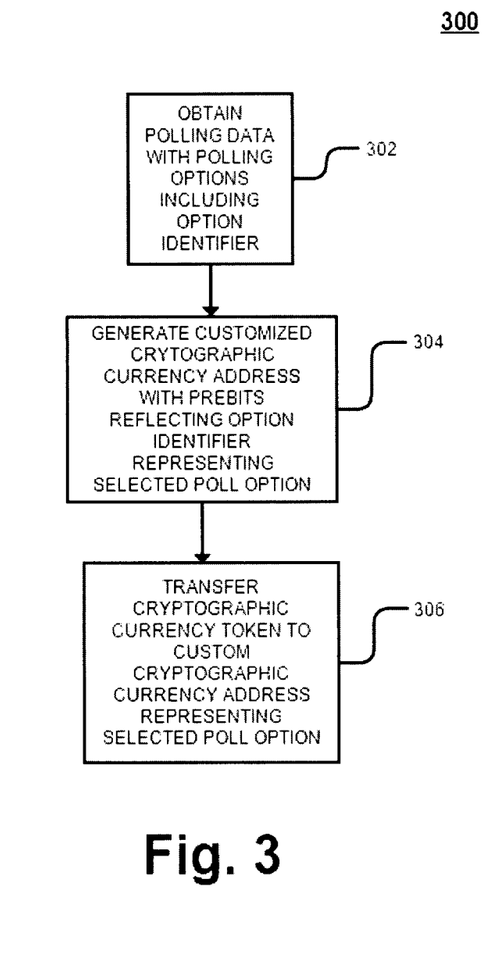
FIG. 3 is a flowchart of a decentralized block chain voting process, according to an embodiment of the present disclosure.

FIG. 3 is a flowchart of a decentralized block chain voting process 300. In a simple embodiment, the voter obtains polling data that may include polling options and associated option identifiers for possible responses 302. The voting client 222 generates or uses a previously generated customized cryptographic currency voting address with pre-bits reflecting a selected poll option 304. The voting client 222, either directly or through a client application 220 transfers cryptographic tokens in an amount representative of the weight of its vote to the customized cryptographic currency address representing the voter's selected poll option 306.

Figure 4:
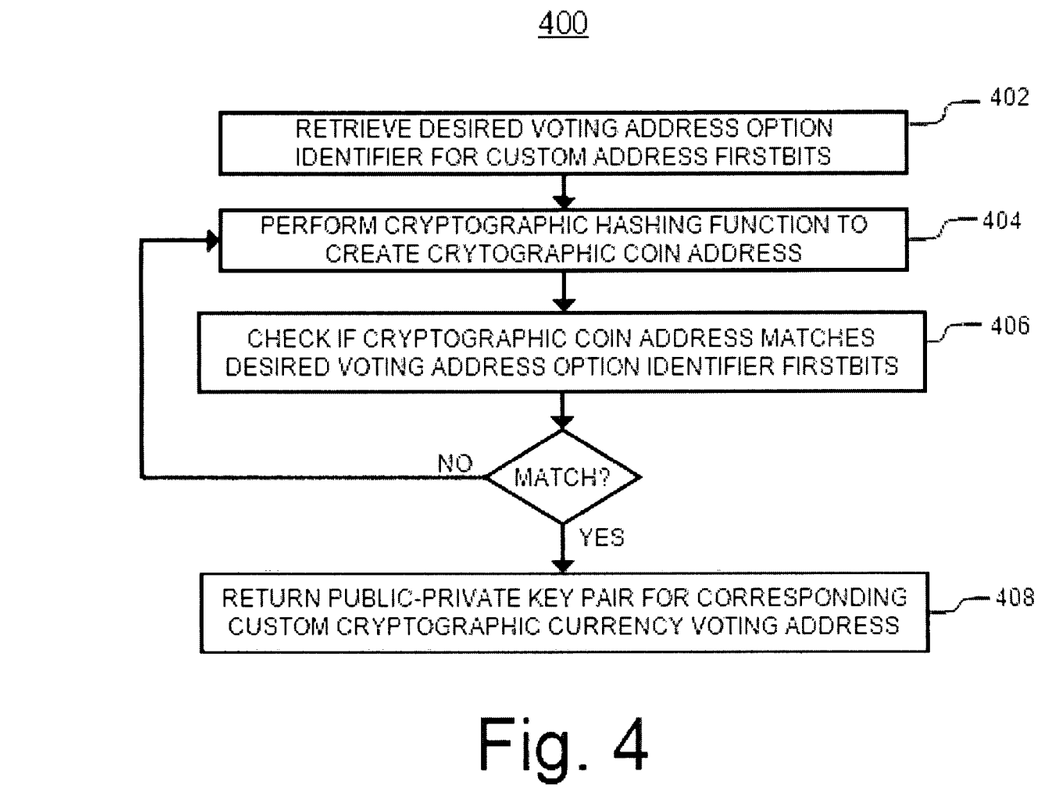
FIG. 4 is a flowchart that shows the process of how customized cryptographic currency voting addresses are created.

FIG. 4 is a flowchart that shows the process 400 of how customized cryptographic currency voting addresses are created.

In operation, the application retrieves the desired voting address first-bits that represent a selected polling option identifier 402. Cryptographic hashing functions are performed to create a cryptographic currency address 404. The resulting cryptographic currency address's first-bits are compared to the retrieved option identifier to check for a match 406. If the generated cryptographic currency address's first-bits do not match the retrieved option identifier, the process is repeated. If the generated cryptographic currency address's first-bits do match the retrieved option identifier, the public-private key pair for this customized cryptographic currency voting address is returned to the voter 408.

Functionality described herein is described with respect to components or modules for clarity. However, this is not intended to be limiting, as functionality can be implemented on one or more modules on one or more devices or distributed across multiple devices.

Figure 5:
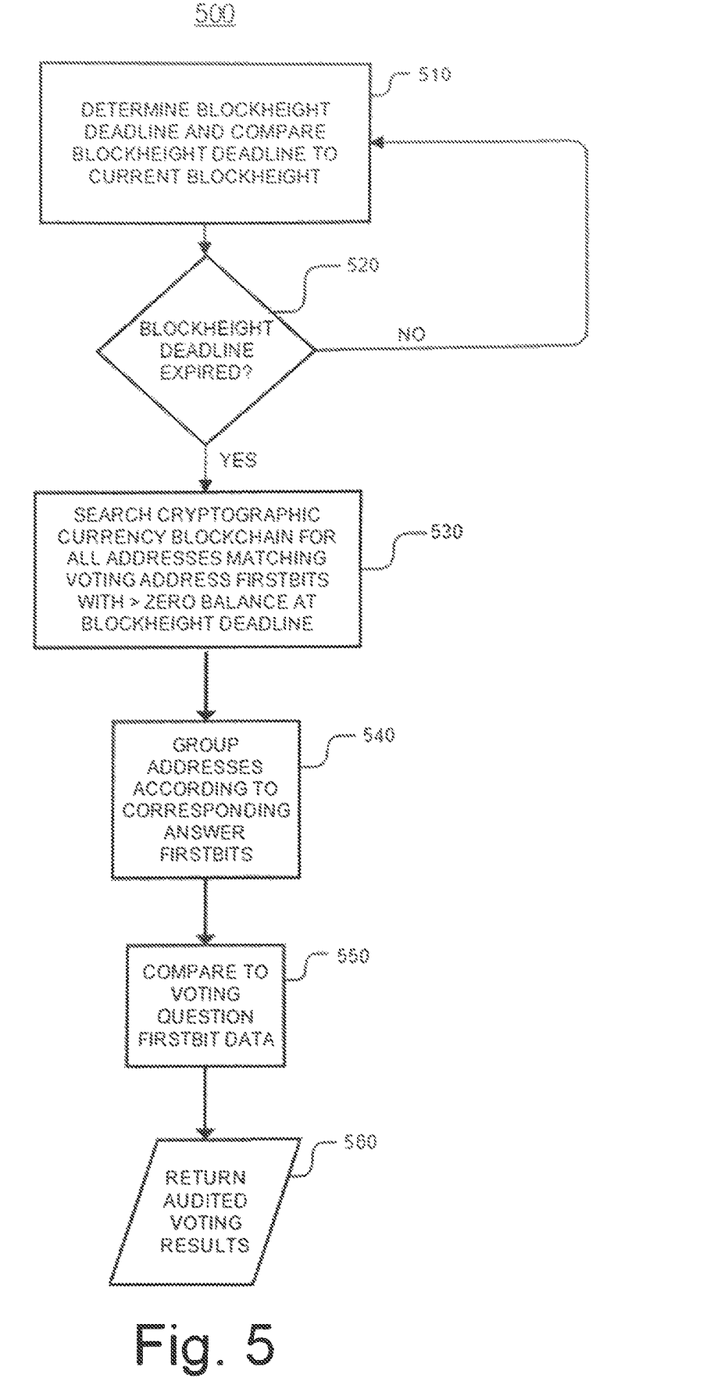
FIG. 5 is a flowchart that shows a process by which votes using the cryptographic currency's block chain are audited when a blockheight deadline is included in the polling data.

FIG. 5 depicts a flowchart that shows a process 500 by which votes using the cryptographic currency's block chain are audited when a block height deadline is included in the polling data.

In operation, the block height deadline is compared to the current block height number of the cryptographic currency's block chain 510. If the block height deadline 520 has not passed the previous step is repeated. If the block height deadline has passed, the cryptographic currency's block chain is searched for all addresses with first-bits matching applicable option identifiers with balances greater than zero as of the block height deadline 530. The addresses with first-bits matching applicable option identifiers are grouped together according to address pre-bits 540. The balances in these addresses are compared to the addresses representing other applicable option identifiers 550 and summed together and returned to audit voting results 560.

Figure 6:
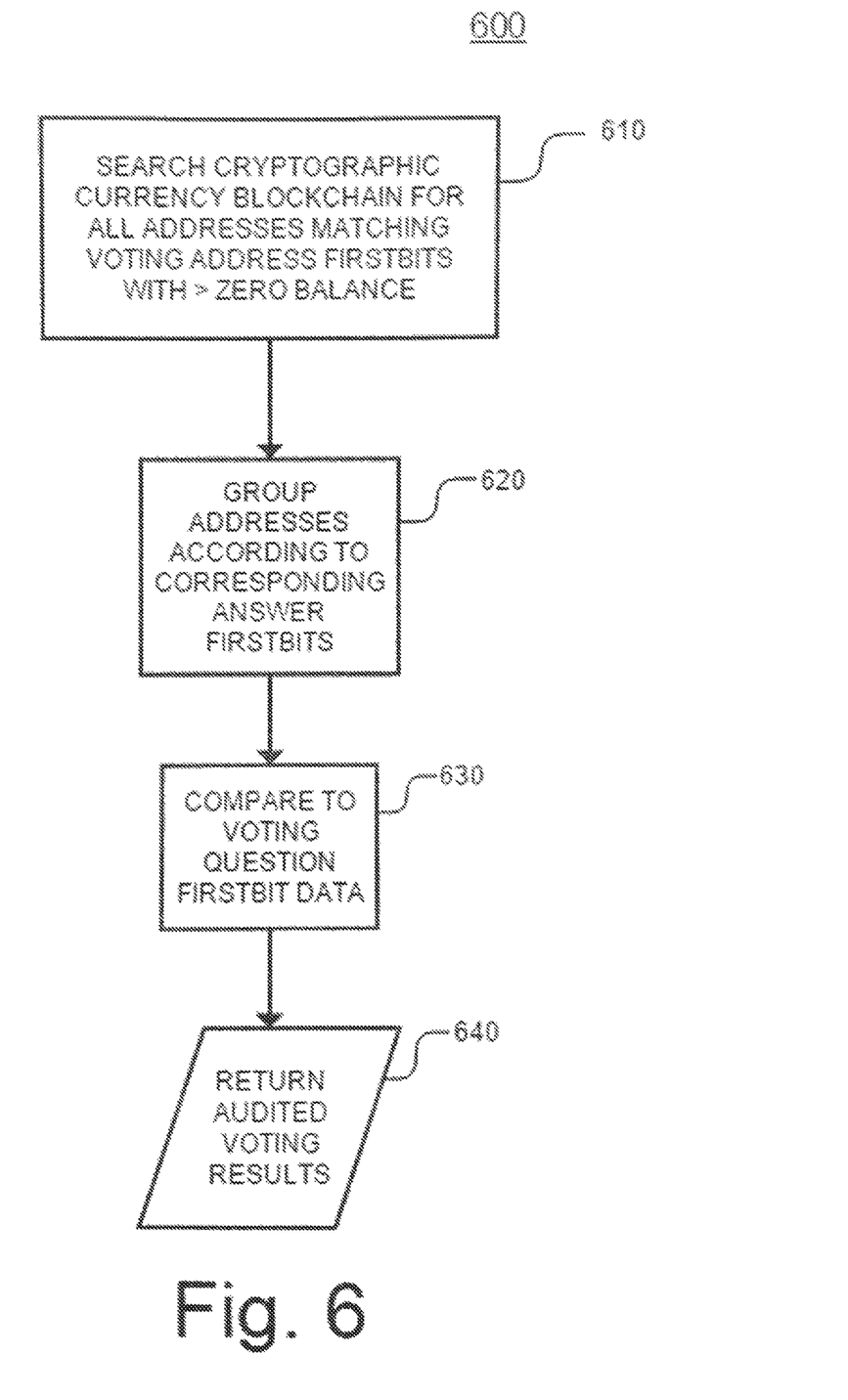
FIG. 6 is a flowchart that shows a process by which votes using the cryptographic currency's block chain are audited when a blockheight deadline is not included in the polling data.

FIG. 6 depicts a flowchart that shows a process 600 by which votes using the cryptographic currency's block chain are audited when a block height deadline is not included in the polling data.

In operation, the cryptographic currency's block chain is searched for all addresses with first-bits matching applicable option identifiers with balances greater than zero 610. The addresses with first-bits matching applicable option identifiers are grouped together according to address pre-bits 620. The balances in these addresses are compared to the addresses representing other applicable option identifiers 630 and summed together and returned to audit voting results 640.

Figure 7:
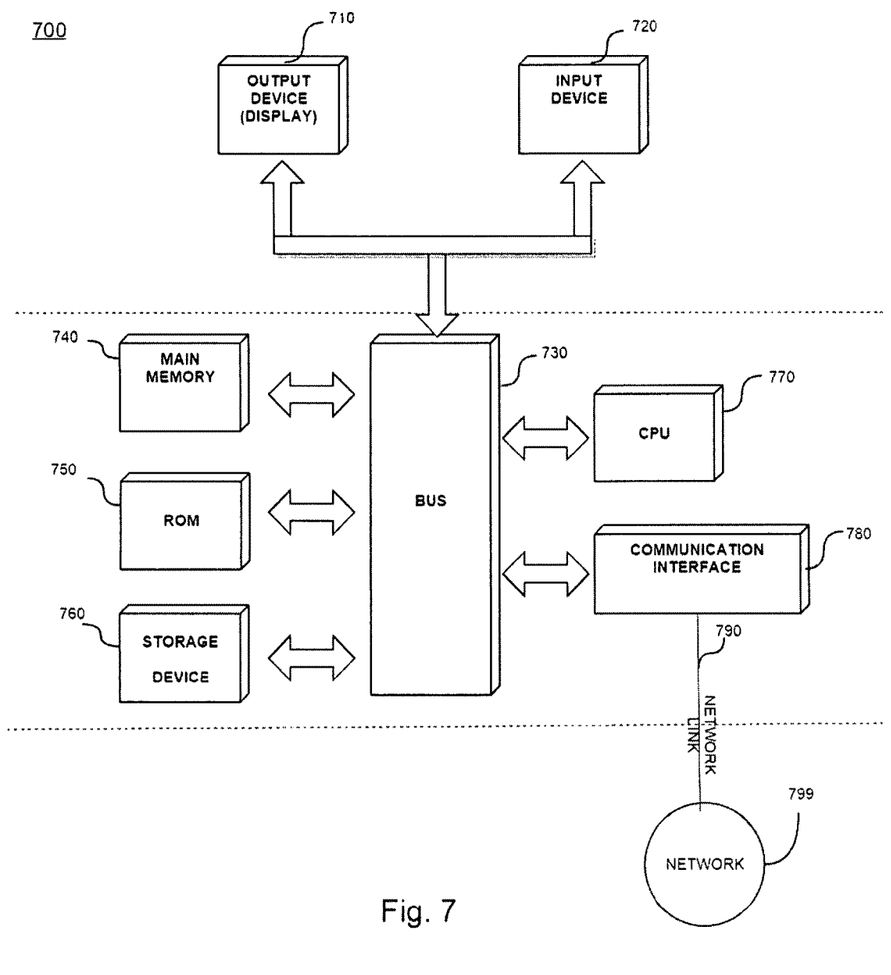
FIG. 7 is a diagram of an illustrative computer system architecture in which this disclosure may be implemented.

FIG. 7 is a diagram of an illustrative computer system 700 in which embodiments of this disclosure may be implemented. System 700 can be a computer, phone, PDA, or any other type of electronic device. Such an electronic device includes various types of computer readable media and interfaces for various other types of computer readable media. As shown in FIG. 7, computer system 700 includes one or more output devices 710, input devices 720, central processing unit (CPU) 770, bus 730, main memory 740, ROM 750, storage device 760 and communication interface 780, which connects through a network link 790, to a network 799. Although FIG. 7 is described herein with reference to computer system architecture, one of skill in the art will recognize that FIG. 7 may also be utilized by other system architecture components without departing from the spirit and scope of the present disclosure.

When the computer is turned on, the computer ROM 750 loads the computer's starting data and loads the required computer software from the storage device 760 in the main memory 740 where it communicates back and forth with the CPU 770 through the system bus 730. The software then manipulates the computer system to communicate on the network by sending data through the communication interface 780 through the network link 790 onto the network 799. ROM 750 stores static data and instructions that are needed by CPU 770 and other modules of system 700. Storage device 760, on the other hand, is a read-and-write memory device. This device is a non-volatile memory unit that stores instructions and data even when system 700 is off. Some implementations of the subject disclosure use a permanent mass-storage device (such as a magnetic or optical disk and its corresponding disk drive) as storage device 760. Other implementations use a removable storage device (such as a floppy disk, flash drive, and its corresponding disk drive) as storage device 760. Like storage device 760, main memory 740 is a read-and-write memory device. However, unlike storage device 760, memory 740 is a volatile read-and-write memory, such a random access memory. Main memory 740 stores some of the instructions and data that the processor needs at runtime. In some implementations, the processes of the subject disclosure are stored in main memory 740, ROM 750, storage device 760 or any combination thereof. For example, the various memory units may include instructions for implementing certain embodiments of the subject disclosure. From these various memory units, CPU 770 retrieves instructions to execute and data to process in order to execute the processes of some implementations.

In operation, a user interacts with computer system architecture by entering in data through an input device 720 and viewing data through an output device 710. Input device 720 may be implemented using any of various types of user input devices including, for example and without limitation, alphanumeric, QWERTY, or T9 keyboards, microphones, and pointing devices (also called "cursor control devices"). Output device 710 may be implemented using any of various types of output devices that enable, for example, the display of images generated by the system 700. Examples of such output devices may include, but are not limited to, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Functionality described herein is described with respect to components or modules for clarity. However, this is not intended to be limiting, as functionality can be implemented on one or more modules on one or more devices or distributed across multiple devices. While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

In broad embodiment, this disclosure can be utilized to administer votes, polls, tallies, status checking, gauging, measurements, auctions, exchanges, wagering, political futures markets, and other activities.

While the foregoing written description of the disclosure enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method and examples, but by all embodiments and methods within the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of decentralized block chain voting, the method comprising:
    retrieving, by a computing device, polling data including a plurality of polling options and an option identifier associated with each polling option;
    generating a customized cryptographic currency address for each of the plurality of polling options, based on the corresponding option identifier associated with each polling option. wherein the customized cryptographic currency address for each of the plurality of polling options is generated such that a prefix of that customized cryptographic currency address is set to the option identifier associated with the corresponding polling option;
    transferring a specified amount of cryptographic tokens to the customized cryptographic currency address for a selected one of the plurality of polling options, wherein the transfer is broadcast to a cryptographic currency network for confirmation and inclusion within a block chain ledger of the cryptographic currency network;
    searching the block chain ledger for cryptographic currency addresses having a set of first-bits that match the option identifier associated with each of the plurality of polling options;
    determining a total number of cryptographic tokens associated with each cryptographic currency address resulting from the search of the block chain ledger;
    calculating a value for each of the plurality of polling options based on the total number of cryptographic tokens associated with the corresponding cryptographic currency address resulting from the search of the block chain ledger;
    identifying the polling option for which the calculated value is highest relative to other polling options; and
    presenting, via a display of the computing device, a representation of the plurality of polling options, wherein the representation indicates the identified polling option as having the highest relative calculated value.

2. The method of claim 1, wherein the polling data is obtained from a remote computing device via a communication network.

3. The method of claim 1, wherein the polling data is obtained via a communication network from a remote peer node within the cryptographic currency network.

4. The method of claim 1, wherein the selected polling option is based on input received from a user of the computing device.

5. A system comprising:
    a processor; and
    a memory having processor-readable instructions stored therein, which when executed by the processor cause the processor to perform a plurality of functions, including functions to:
    retrieve polling data including a plurality of polling options and an option identifier associated with each polling option;
    generate a customized cryptographic currency address for each of the plurality of polling options, based on the corresponding option identifier associated with each polling option wherein the customized cryptographic currency address for each of the plurality of polling options is generated such that a prefix of that customized cryptographic currency address is set to the option identifier associated with the corresponding polling option;
    transfer a specified amount of cryptographic tokens to the customized cryptographic currency address generated for a selected one of the plurality of polling options, wherein the transfer is broadcast to a cryptographic currency network for confirmation and inclusion within a block chain ledger of the cryptographic currency network;
    search the block chain ledger for cryptographic currency addresses having a set of first-bits that match the option identifier associated with each of the plurality of polling options, based on the determination;
    determine a total number of cryptographic tokens associated with each cryptographic currency address resulting from the search of the block chain ledger;
    calculate a value for each of the plurality of polling options based on the total number of cryptographic tokens associated with the corresponding cryptographic currency address resulting from the search of the block chain ledger;
    identify the polling option for which the calculated value is highest relative to other polling options; and
    present, via a display of the computing device, a representation of the plurality of polling options, wherein the representation indicates the identified polling option as having the highest relative calculated value.

6. The system of claim 5, wherein the polling data is obtained from a remote computing device via a communication network.

7. The system of claim 5, wherein the polling data is obtained via a communication network from a remote peer node within the cryptographic currency network.

8. The system of claim 5, wherein the customized cryptographic currency address for each of the plurality of polling options is generated such that a prefix of that customized cryptographic currency address is set to the option identifier associated with the corresponding polling option.

9. The system of claim 5, wherein the selected polling option is based on input received from a user of the computing device.

10. A computer-readable non-transitory storage medium having instructions stored therein, which when executed by a computer cause the computer to perform a plurality of functions, including functions to:
    retrieve polling data including a plurality of polling options and an option identifier associated with each polling option;
    generate a customized cryptographic currency address for each of the plurality of polling options, based on the corresponding option identifier associated with each polling option wherein the customized cryptographic currency address for each of the plurality of polling options is generated such that a prefix of that customized cryptographic currency address is set to the option identifier associated with the corresponding polling option;

transfer a specified amount of cryptographic tokens to the customized cryptographic currency address generated for a selected one of the plurality of polling options, wherein the transfer is broadcast to a cryptographic currency network for confirmation and inclusion within a block chain ledger of the cryptographic currency network;

search the block chain ledger for cryptographic currency addresses having a set of first-bits that match the option identifier associated with each of the plurality of polling options, based on the determination;

determine a total number of cryptographic tokens associated with each cryptographic currency address resulting from the search of the block chain ledger;

calculate a value for each of the plurality of polling options based on the total number of cryptographic tokens associated with the corresponding cryptographic currency address resulting from the search of the block chain ledger;

identify the polling option for which the calculated value is highest relative to other polling options; and present, via a display of the computing device, a representation of the plurality of polling options, wherein the representation indicates the identified polling option as having the highest relative calculated value.

11. The computer-readable storage medium of claim 10, wherein the polling data is obtained from a remote computing device via a communication network.

12. The computer-readable storage medium of claim 10, wherein the polling data is obtained via a communication network from a remote peer node within the cryptographic currency network.

13. The computer-readable storage medium of claim 10, wherein the customized cryptographic currency address for each of the plurality of polling options is generated such that a prefix of that customized cryptographic currency address is set to the option identifier associated with the corresponding polling option.

14. The computer-readable storage medium of claim 10, wherein the selected polling option is based on input received from a user of the computing device.

* * * * *